Aug. 26, 1941.  J. LIPANI  2,253,908
HEIGHT GAUGE INDICATING SCRIBING TOOL
Filed April 25, 1940  2 Sheets-Sheet 1
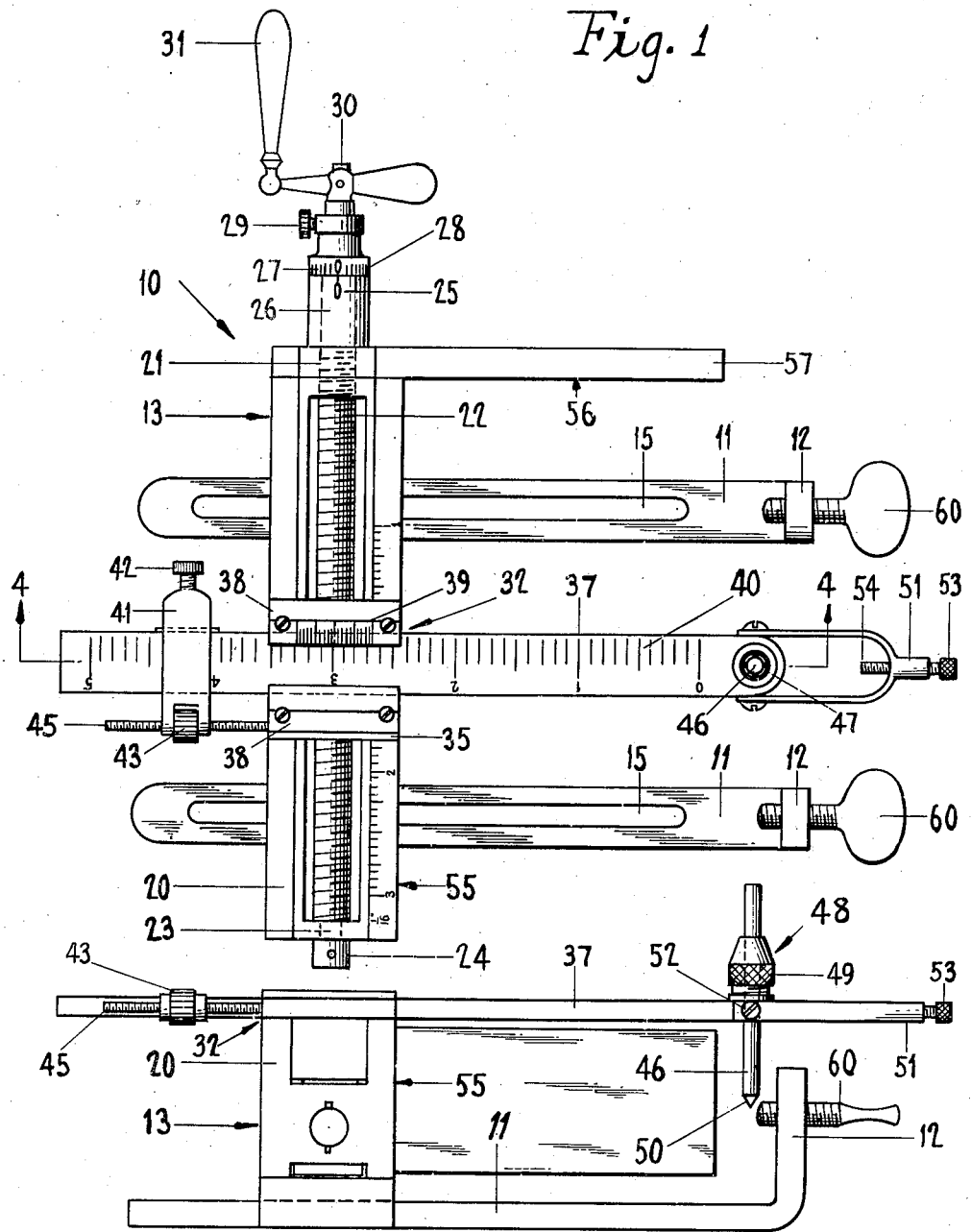
JOSEPH LIPANI
INVENTOR.
BY Joseph Blacker
ATTORNEY.

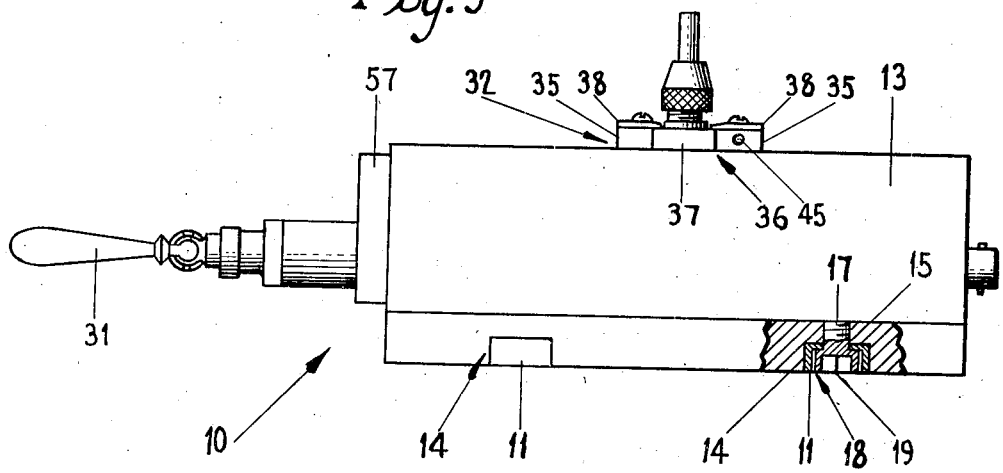
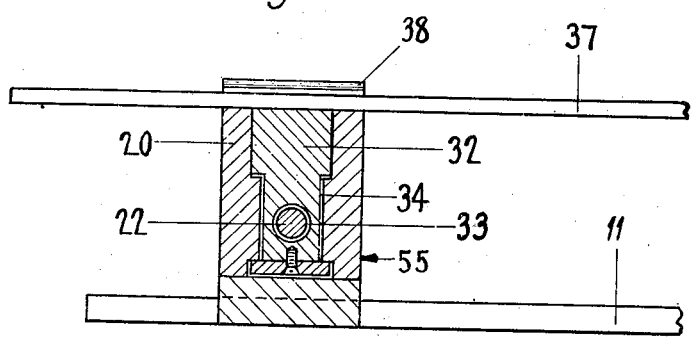

Patented Aug. 26, 1941

2,253,908

UNITED STATES PATENT OFFICE 2,253,908

HEIGHT GAUGE INDICATING SCRIBING TOOL

Joseph Lipani, Brooklyn, N. Y.

Application April 25, 1940, Serial No. 331,569

5 Claims. (Cl. 33—32)

This invention relates to a combined micrometer and vernier height gauge used for laying out tools and dies, jigs, and fixtures, by scribing and center punching.

An object of this invention is to provide an indicating scribing tool for machine shop use by means of which a mechanic can quickly lay out work with precision and without the use of toolmaker's buttons.

Another object of this invention is to provide a tool of the class described comprising two base-bars having means for clamping a work-piece or rectangular piece of metal thereon and against both legs of a "square" or right-angular member integral with said base-bars, the said tool having means for scribing lines on said work-piece in parallel relation with one side thereof.

Another object of this invention is to provide a cross-slide in one of the legs of the said square and micrometer means for adjusting the said slide with precision in relation to the other leg of the square.

Another object of this invention is to provide a graduated blade having vernier divisions thereon, the said blade being slidably and adjustably mounted in the cross-slide for precision movements in relation to the micrometer side of the square.

Another object of this invention is to provide a scribing marker preferably in the form of a pin and being slidably mounted for vertical adjustments in the said blade, the said blade having a swingable clamp integral therewith for maintaining the marker in any desired adjustment.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which:

Figure 1 is a plan view of my high gauge indicating scribing tool.

Figure 2 is a side view of the tool shown in Figure 1.

Figure 3 is an end view of the tool, partly broken away at its lower elevation to show the operation of a socket head clamping screw, without the vernier adjustment.

Figure 4 is a cross-sectional view, the section being taken as on line 4—4 in Figure 1.

In the illustrated embodiment of the invention, the numeral 10 indicates a combined micrometer and vernier height gauge comprising two spaced base-bars 11, having angular upward extensions 12. A square or right-angular member 13 has been slidably mounted on the base-bars 11 by means of through slots 14 in the lower surface of one of the legs of the square.

The base-bars 11 have slots 15 for screws 17. The base-bars have undercut grooves 18 for receiving the heads of the screws 17. The heads are formed with sockets 19 to receive wrenches, as is well known in the art.

As shown in Figure 3, the screw 17 may be released to permit slidable adjustment of a base-bar 11 in the slot 14. Each base-bar 11 may thus have its clamping extension 12 adjusted in relation to an enlarged leg 20 of the square 13.

The leg 20 comprises a threaded end 21 in which an elongated micrometer screw 22 has been threadably secured, and an end 23 providing a clearance opening for a reduced portion of the screw 22. A collar 24 serves to maintain the screw 22 rotatably mounted in the leg 20.

A zero mark 25 has been formed on the sleeve 26 and micrometer readings 27 have been formed on a spindle 28. A screw 29 in the spindle 28 serves for adjusting the spindle on the outer end portion 30 of the micrometer screw 22. A handle 31 has been fixed on the end portion 30 and serves for rotating the micrometer screw.

As shown in Figure 4, a cross-slide 32 having a threaded aperture 33 to fit the micrometer screw 22, has been threadedly secured to said screw. It is to be noted that the leg 20 has an elongated guideway 34 permitting slidable motion therethrough for the cross-slide. The cross-slide 32 is thus slidably mounted longitudinally of the leg 20.

As shown in Figures 3 and 4, the upper end of the cross-slide 32 has two arms 35, 35 forming a slideway 36 therebetween for a vernier blade 37. Plates 38, one of which has vernier readings 39 thereon, have been secured to the arms 35 and hold the vernier blade in slidable engagement right-angularly of the leg 20. The blade 37 has vernier readings 40.

A slotted clamp 41 has been slidably mounted on the vernier blade 37 and is adjustable on said blade by means of a screw 42. The clamp 41 has an adjusting nut 43 rotatably mounted in a bifurcated end portion thereof, opposite the screw 42. A screw 45 fixed in one of the arms 35 passes through clearance holes in the clamp 41 and is in threaded engagement with the nut 43.

By adjusting the nut 43 it is thus possible to adjust the position of the vernier blade 37 in relation to the leg 29 of the square 13, as is well known in the machine manufacturing art.

A scribing marker 46 has been slidably mounted for vertical adjustment in an aperture 47 at one end of the blade 37. A chuck 48 having frictional engaging jaws, the action of which is well known in the art, has a threaded nut 49 by means of which it is possible to frictionally grip the marker 46 after its height has been properly adjusted by the user.

For the purpose of maintaining the marker 46 in locked position, so that its scribing and center punching lower end 50 will be rigid and be adapted to inscribe visible lines in the work-piece, I have provided a substantially U-shaped clamp 51 pivotally secured by screws 52 to one end portion of the blade 37. I have provided a screw 53 in the far end portion of the clamp 51. By swinging the clamp 51 to a position above the marker 46, I can adjust the screw 53 to bring its lower end 54 in direct contact with the upper end of the marker 46 and thus lock the marker against upward movement.

It is to be noted that my vernier scale 37 has been mounted on top of the enlarged leg 29 so as to leave the entire vertical face 55 of the said arm facing the scribing marker 46 free and clear of any measuring devices. The entire vertical face 56 of the leg 57 facing the scribing marker 46 is also free and clear. The user may thus utilize the entire areas of the faces 55 and 56 of the square for laying out workpieces with accuracy and precision.

Operation of invention

In operation, the user places a rectangular workpiece on the base-arms 11 and adjusts the wing screws 60 so as to clamp the workpiece against the square faces 55 and 56. The user then actuates the handle 31 and adjusts the micrometer screw 22 and moves the cross-slide 32 so as to bring the outer surface of the scribing marker 46 in contact with the vertical face 56 of the leg 57. As shown in the drawings, the scribing marker 46 is one-eighth of an inch in diameter. The user then sets the spindle 28 so that the micrometer readings point to zero.

Assuming that a line three inches long is to be scribed parallel to the face 55, starting one inch from the said face, the user moves the vernier blade 37 and brings the outer surface of the scribing marker 46 in contact with the vertical face 55. The user then actuates the vernier blade 37 and brings the outer surface of the scribing marker the required distance away from the surface 55. With a one-eighth inch diameter marker, the distance moved from the surface 55 is fifteen-sixteenths of an inch.

The user now swings the clamp 51 so that the lower end of the screw 53 contacts the upper end of the scribing marker 46. The screw 53 is now turned to bring the scribing end 50 in forced contact with the upper surface of the workpiece. The height gauge 10 is now set for scribing the three inch line on the workpiece.

The user now actuates the handle 31 so as to move the scribing marker 46 in pressed contact with the workpiece a distance of three inches. These three inches are now represented by a scribed line in the workpiece in parallel relation with the face 55.

When the user desires to scribe a line parallel with the face 56, he moves the vernier blade 37 to bring the outer surface of the scribing marker 46 in contact with the surface 55. The user then moves the blade 37 the required distance away from the surface 55 and tightens the screw 42 and manipulates the adjusting nut 43 to secure correct vernier readings. The user then manipulates the clamp 51 and the screw 53 to bring the lower end 50 of the marker 46 in forced contact with the workpiece. The user then moves the blade 37 and inscribes a line on the workpiece in parallel relation with the surface 56. This movement is continued until the line reaches the first made line. The user then impresses a center punch mark at this intersection. This mark may be made by rotation of the screw 53 causing downward movement thereof or by swinging the clamp 51 out of the way and lightly punching the scriber with a hammer.

For the completion of the scribed lines, the user manipulates the scribing marker and the micrometer and vernier as heretofore.

It will thus be seen that there has been provided a combined micrometer and vernier height gauge which makes it possible for a mechanic to quickly lay out work with precision and without the use of toolmaker's buttons as heretofore, and without the necessity of drilling and tapping holes for the buttons.

It is to be noted that in place of the scribing marking pin 46, I may insert a center drill in the chuck 48, and bring the height gauge 10 to a drill press and spot the intersection of the scribed lines by drilling and reaming a one-eighth inch hole for a one-eighth inch dowel pin. The dowel pin may thus take the place of the buttons presently used. To drill and bore a larger hole in the position occupied by the dowel pin, the user places the workpiece on a face plate and locates the center of the dowel pin by means of a dial indicator.

From the above description, it will be seen that the mechanic or toolmaker does not have to guess the position for the center punch, because in this tool the exact location of the intersection of scribed lines is definitely fixed by a chuck which may be used either for locating a center drill or a center punch automatically and without any guess work. It is also to be noted that the square 13 may be used without the base-bars 11, by clamping the workpiece against the square by means of a C clamp or a parallel clamp.

In accordance with the patent statutes, I have described and illustrated the preferred embodiment of my invention, but it will be understood that various changes and modifications can be made therein without departing from the spirit of the invention as defined by the appended claims.

I claim:

1. A combined micrometer and vernier height gauge, comprising two base-bars, a right-angular member having horizontal legs with vertical inner faces and being slidably mounted on said base-bars, said base-bars having angular upward extensions at one end and means in said extensions for clamping a work-piece against said right-angular member, a cross-slide slidably mounted longitudinally of one of said legs, micrometer means interiorly of said cross-slide carrying leg for adjusting said cross-slide, a graduated scale having vernier divisions thereon and being slidably mounted in said cross-slide and in parallel relation with one of the inner faces of said right-angular member, said scale being in overhanging and in right-angular relation with said cross-slide carrying leg, a scribing marker vertically adjustable at one end of said blade, and a swingable clamp mounted at the marker end of said blade for maintaining said marker in any desired vertical adjustment.

2. A height gauge comprising base-bars, a right-angular member having horizontal legs with vertical inner faces and being slidably mounted on said base-bars, means for securing said right-angular member to said base-bars, said base-bars having extensions and means for clamping a work-piece against said right-angular member, a cross-slide slidably mounted longitudinally of one of said legs, micrometer means interiorly of said cross-slide carrying leg for slidable adjustment of said cross-slide, a graduated scale slidably mounted in said cross-slide and in parallel relation with one of the inner faces of said right-angular member, a graduated scale fixed to said cross-slide, said slidable scale being in right-angular relation with said cross-slide carrying leg, vernier means for adjusting said slidable scale, a scribing marker held in a chuck in vertically adjustable position at one end of said slidable scale, and means at the marker end of said slidable scale for preventing upward movement of said marker from its vertical adjustment.

3. A combined micrometer and vernier height gauge, comprising base-bars, a right-angular member having horizontal legs with vertical inner faces and being slidably mounted on said base bars, said base-bars having means for clamping a work-piece against said right-angular member, a cross-slide slidably mounted longitudinally of one of said legs, means interiorly of said cross-slide carrying leg for adjusting said cross-slide, a scale slidably mounted in said cross-slide in right-angular relation with said cross-slide carrying leg, vernier means for adjusting said scale, a scribing marker vertically adjustable in a chuck at one end of said scale, and a clamp at the marker end of said scale for maintaining said marker in any desired vertical adjustment.

4. A height gauge comprising base-means, a right-angular member having horizontal legs with vertical inner faces and being secured to said base-means, said base-means having extensions and means for clamping a work-piece against said right-angular member, a cross-slide slidably mounted longitudinally of one of said legs, an elongated screw threadably mounted interiorly of said cross-slide carrying leg for slidable adjustment of said cross-slide, means for adjusting said screw, a graduated scale slidably mounted in said cross-slide and in parallel relation with one of the inner faces of said right-angular member, said slidable scale being in right-angular relation with said cross-slide carrying leg, vernier means for adjusting said slidable scale, a scribing marker held in a chuck in vertically adjustable position at one end of said slidable scale, and clamping means at the marker end of said slidable scale for preventing upward movement of said marker from its vertical adjustment.

5. A height gauge comprising base-means, a right-angular member having horizontal legs with vertical inner faces and being secured to said base-means, said base-means having means for clamping a work-piece against said right-angular member, a carrier slidably mounted longitudinally of one of said legs, means mounted on said carrier carrying leg for slidable adjustment of said carrier, a graduated scale slidably mounted in said carrier and in parallel relation with one of the inner faces of said right-angular member, vernier means for adjusting said slidable scale, a marker vertically adjustable at one end of said slidable scale, and means at the marker end of said slidable scale for preventing upward movement of said marker from vertical adjustment.

JOSEPH LIPANI.